(12) United States Patent
Iwasaki et al.

(10) Patent No.: US 6,586,546 B2
(45) Date of Patent: Jul. 1, 2003

(54) PROCESS FOR MANUFACTURE OF A COPOLYMER OF TETRAFLUOROETHYLENE AND PERFLUORO (ALKYL VINYL ETHER)

(75) Inventors: Takahiko Iwasaki, Shimizu (JP); Masahiro Kino, Shimizu (JP)

(73) Assignee: DuPont-Mitsui Fluorochemicals Co. Ltd., Tokyo (JP)

( * ) Notice: Subject to any disclaimer, the term of this patent is extended or adjusted under 35 U.S.C. 154(b) by 0 days.

(21) Appl. No.: 09/881,220

(22) Filed: Jun. 14, 2001

(65) Prior Publication Data
US 2002/0028895 A1 Mar. 7, 2002

(30) Foreign Application Priority Data
Jun. 19, 2000 (JP) ......................................... 2000-182615

(51) Int. Cl.[7] ............................... C08F 2/10; C08F 2/16; C08F 2/38; C08F 214/26; C08F 214/18
(52) U.S. Cl. ..................... 526/207; 526/247; 526/250
(58) Field of Search ................................ 526/250, 247, 526/207

(56) References Cited

U.S. PATENT DOCUMENTS

| 3,635,926 A | | 1/1972 | Gresham et al. | |
|---|---|---|---|---|
| 3,707,519 A | | 12/1972 | Hahn et al. | |
| 4,391,940 A | | 7/1983 | Kuhls et al. | |
| 5,349,003 A | * | 9/1994 | Kato | 524/458 |
| 5,652,147 A | | 7/1997 | Kawamura et al. | |

FOREIGN PATENT DOCUMENTS

| EP | 1006129 A | 6/2000 |
|---|---|---|
| JP | 11 246447 A | 9/1999 |

OTHER PUBLICATIONS

J. M. Dealey and K. F. Wissbrun, "Melt Rheology and Its Role in Plastics Processing", Von Nostrand Reinhold, New York 1990, p. 597.

* cited by examiner

*Primary Examiner*—Fred Zitomer

(57) ABSTRACT

Aqueous copolymerization of TFE and PAVE in the presence of a small amount of terpene enables the manufacture of a more uniform melt-fabricable copolymer with a narrower molecular weight distribution. The copolymer exhibits improved flex life.

6 Claims, No Drawings

PROCESS FOR MANUFACTURE OF A COPOLYMER OF TETRAFLUOROETHYLENE AND PERFLUORO (ALKYL VINYL ETHER)

CROSS REFERENCE TO RELATED APPLICATION

This application claims benefit of Japanese application number 2000-182615 filed Jun. 19, 2000.

FIELD OF THE INVENTION

The present invention relates to a process for copolymerizing tetrafluoroethylene (TFE) and perfluoro(alkyl vinyl ether) (PAVE) to give a melt-fabricable copolymer with uniform distribution of the monomers in the polymer. It further relates to a process for manufacture which enables the formation of a melt-fabricable copolymer of tetrafluoroethylene and perfluoro(alkyl vinyl ether) having narrow molecular weight distribution and having excellent mechanical properties such as flex life.

BACKGROUND OF THE INVENTION

TFE/PAVE copolymer (PFA), has the advantage over TFE homopolymer (PTFE) that is melt-fabricable, and yet retains the excellent properties of PTFE such as heat resistance, corrosion resistance, weathering resistance, and the like. By melt-fabricable is meant that the copolymer can be processed into shaped articles such as films, fibers, tubes, wire coatings and the like by conventional melt extruding means. Because of this, PFA finds extensive commercial use.

In PFA it is desirable that the monomer be incorporated uniformly in the polymer chain, as determined by the concentrations and relative reactivities of the monomers toward polymerization. However, because TFE is a more reactive monomer than PAVE, and has a strong tendency to homopolymerize, attempts to copolymerize TFE with PAVE can yield polymer in which the monomers are not incorporated uniformly, but rather with TFE-rich portions and PAVE rich portions, and possibly even some PTFE. The portions of the polymer richer in TFE are higher melting, and PTFE may not melt at all. This can affect the melt-processibility of the polymer, and cause "gel", bits of unmelted or imperfectly melted polymer, which is especially noticeable in film extrusion or molding.

Nonuniform incorporation of monomer can broaden molecular weight distribution (MWD), with excessive TFE incorporation giving high molecular weight polymer. Because PFA grades are classified by melt viscosity, polymer with too much high molecular weight component will also require excessive low molecular weight component to be in specification with regard to melt viscosity, usually expressed as melt flow rate (MFR). The result is an overbroad molecular weight distribution. The presence of greater amounts of low molecular weight material can affect the durability of articles molded therefrom, for example by reducing flex life. Therefore, as has been disclosed in U.S. Pat. No. 3,635,926, PFA with a broad molecular weight distribution tends to give inferior physical properties compared to PFA with a narrower molecular weight distribution even at equivalent melt viscosities.

Flex life, an indication of strength against repeated flexing, as a function of MFR, PAVE content, and MWD, can be measured by performance testing, such as in accordance with the "MIT Flex Test", ASTM D 2176, or can be expressed by the equation given below, where the flex life (number of cycles to failure) is [FL]; PAVE content (% by weight) is [PAVE]; MFR (g/10 min) is [MFR]; and molecular weight distribution is represented by the molecular weight distribution index [MWDI], which is defined in the Example Section ("ln" is the natural logarithm):

$$\ln[FL] = B_1 + B_2 \cdot \ln[MFR] + B_3 \cdot \ln[MWDI] + B_4 \cdot \ln[PAVE]$$

The equation suggests a high flex life PFA can be obtained by reducing MFR, increasing the PAVE content, and/or increasing MWDI. For example, when coefficients $B_1$–$B_4$ are calculated from observed values from TFE/PPVE copolymer, equation (1) below results.

$$\ln[FL] = 11.208 - 1.695 \cdot \ln[MFR] - 7.846 \cdot \ln[MWDI] + 3.648 \cdot \ln[PAVE] \qquad (1)$$

With TFE/PAVE polymers of other perfluoro(alkyl vinyl ethers), the coefficients are slightly different, but the conclusion is the same. In actual flex life testing, flex life improves as molecular weight distribution narrows (uniformity increases), copolymer composition and melt viscosity being held constant.

MFR must be high enough to permit melt processing of the PFA; the PAVE content must also be limited within a certain narrow range in view of PFA physical properties and for economic reasons. Therefore, with the MFR and PAVE content fixed, MWDI presents an important means for improving the physical properties. For example, if PAVE content is fixed at 5.5% by weight and MFR at 5.0 g/10 minutes, the flex life as a function of MWDI is represented by Equation 2 below, which shows that a small variation of MWDI will significantly affect the flex life.

$$\ln[FL] = 14.70 - 7.846 \cdot \ln[MWDI] \qquad (2)$$

The above reasoning leads to the conclusion that one should make a copolymer with as uniform a distribution as possible with respect to TFE and PAVE and a narrow molecular weight distribution by suppressing the homopolymerization of the TFE monomer in the manufacture of PFA.

To increase copolymer uniformity, it has been traditional to polymerize in a chlorofluorocarbon (CFC) solvent such as CFC-113 ($CFCl_2$—$CF_2Cl$) or CFC-114 ($CF_2Cl$—$CF_2Cl$). However, the use of CFCs has been restricted for environmental reasons. Aqueous emulsion polymerization is an alternative method, but it is more difficult to obtain uniform copolymer in aqueous polymerization. U.S. Pat. No. 3,635,926 discloses the use of gaseous chain transfer agents such as methane, ethane, and hydrogen as a way to narrow molecular weight distribution in TFE/PAVE copolymers. Improvements are needed in aqueous polymerization of TFE/PAVE copolymers to further narrow molecular weight distribution.

SUMMARY OF THE INVENTION

As a result of studies by the inventors to overcome the above problems and to polymerize so as to generate a more uniform copolymer with a narrower molecular weight distribution for improved flex life, they have discovered that copolymerization of TFE and PAVE in the presence of a terpene in an aqueous polymerization medium produces a melt-fabricable TFE/PAVE copolymer (PFA) having a uniformly distributed PAVE. The small amount of terpene added to the polymerization system does not decrease the rate of polymerization, but is present in an amount that is effective to improve the uniformity of the resin by narrowing the molecular weight distribution.

The present invention is a process for manufacturing PFA, which comprises copolymerizing TFE and PAVE in the presence of a terpene in an aqueous polymerization medium. The resulting PFA copolymer has a narrower molecular weight distribution than obtained heretofore, this narrower molecular weight distribution being characterized by a half-width value in its differential scanning calorimeter (DSC) melting peak which is at least 10% less than the half width value of the copolymer when made without the presence of the terpene.

DETAILED DESCRIPTION

The comonomer PAVE (perfluoro(alkyl vinyl ether)) used in this invention is a compound that is also called perfluoroalkoxytrifluoroethylene, represented by formula 3 below.

$$CF_2=CF-O-C_nF_{(2n+1)} \quad (3)$$

In the PAVE of this invention n=1–10, preferably n=1–3, exemplified by such PAVEs as perfluoro(methyl vinyl ether) (PMVE), perfluoro(ethyl vinyl ether) (PEVE), perfluoro (propyl vinyl ether) (PPVE), more preferably by perfluoro (propyl vinyl ether) (PPVE).

The PAVE content in the PFA of this invention is sufficient to make the copolymer melt-fabricable and is about 0.5–20 mole %, preferably about 1 to 15 mole %, more preferably about 2 to 10 mole %.

Copolymerization of TFE with PAVE is carried out in an aqueous medium. The polymerization medium is essentially deionized water, optionally containing a small amount of other solvents but not more than about 5% by volume of the total volume of solvent.

To control the molecular weight and molecular weight distribution, the aqueous emulsion polymerization process is carried out, preferably using a gaseous chain transfer agent such as hydrogen, methane, or ethane as disclosed in U.S. Pat. No. 3,635,926. According to the patent, gaseous chain transfer agent is also effective for narrowing the molecular weight distribution, resulting in improved flex life, but the addition of such a chain transfer agent alone is inadequate in the aqueous polymerization process of this invention for the formation of a sufficiently narrow molecular weight distribution polymer. It has been discovered that addition of terpene has the effect of producing a uniform copolymer with a narrow molecular weight distribution in the copolymerization of TFE and PAVE in an aqueous polymerization medium of this invention. A commercially excellent PFA with narrow molecular weight distribution is obtained when a terpene is added.

In the case of solution polymerization using a chlorofluorocarbon or hydrofluorocarbon or a suspension polymerization in a mixed solvent with a large amount of nonaqueous solvent, there is no beneficial effect of adding a terpene.

The polymerization initiator used is a conventional organic peroxide polymerization initiator, a redox polymerization initiator or the like, such as bis(fluoroacyl)peroxide, bis(chlorofluoroacyl)-peroxide, a diacyl peroxide, a dialkyl peroxy dicarbonate, a peroxy diester, or a persulfate salt.

The surfactant used for the emulsion polymerization may be a conventional surfactant, preferably ammonium perfluorooctanoate (C-8), which is inert to chain transfer.

The terpene added to the polymerization system is preferably one expressed by the molecular formula represented by general formula (4) below.

$$(C_5H_8)_n \ (n=1-3) \quad (4)$$

A typical and readily available terpene is limonene $(C_{10}H_{16})$.

The amount of terpene added should be about 1–100 ppm, preferably about 1–20 ppm, with respect to the total weight of monomers, TFE and PAVE, in the polymerization kettle. Lower concentrations of terpene are less effective in regulating the molecular weight distribution, while too high a concentration can cause polymer discoloration.

Any appropriate method may be selected as a way to add the terpene; for example, it may be mixed with the TFE or comonomer PAVE, which is charged to the polymerization kettle; the terpene may be directly charged to the polymerization kettle; or the terpene may be dissolved in the surfactant solution, which is then charged to the polymerization kettle.

The terpene of this invention is not a substitute for gas phase chain transfer agent. The latter, in addition to acting as a chain transfer agent in the emulsion phase, also reduces polymerization in the gas phase, which is predominately composed of TFE monomer, and to retard formation of high molecular weight PTFE in the gas phase. The terpene of this invention will beneficially affect molecular weight distribution independent of the gas phase chain transfer agent. However, it will generally be desirable to use gas phase chain transfer agent in addition to the terpene.

The melt-fabricable copolymers of TFE and PAVE obtained in this invention are characterized by flow at a temperature above their melting points, which will differ depending upon the PAVE type, its content, the molecular weight, and the like. The copolymers preferably have a melt flow rate (MFR) at 372° C. of about 0.5–500 g/10 min, preferably about 0.5–100 g/10 min, more preferably about 1 to 50 g/10 min, and most preferably about 1 to 40 g/10 min.

Copolymerization in this invention in the presence of a terpene gives a product with a narrow melting range, which is defined by a sharp peak in a melt curve in a DSC measurement, with a half-width value of preferably not more than 8° C. in the melting peak in the DSC at a heating rate of 10° C./min. This small half-width value indicates relatively uniform segments of $\sim CF_2-CF_2\sim$ repeat units, denoting the uniform distribution of the PAVE units. For comparison, commercial grades of TFE/PPVE polymer of similar composition and made by a similar process without added terpene have greater half-width values: Teflon(® PFA 350, 13.4° C.; Teflon® PFA 440, 11.7° C.

EXAMPLES

The present invention is specifically explained by the following examples. The materials used for manufacturing copolymers in these examples and the methods for measuring the physical properties of the copolymers are given below.

(A) Polymerization Raw Materials

| Monomer: | tetrafluoroethylene (TFE) |
| --- | --- |
| | perfluoropropyl vinyl ether (PPVE) |
| Polymerization initiator: | ammonium persulfate (APS, |
| | Kanto Kagaku KK Tokyo Japan) |
| Surfactant: | ammonium perfluoro octanoate (C-8) |
| Terpene: | d-limonene (Shiono Perfumery Co., Osaka Japan |

(B) Method for Measuring Physical Properties
 (1) Melt Flow Rate (MFR)
 A melt indexer manufactured by Toyo Seiki Co. Tokyo Japan is used; a 5 g sample is filled into a cylinder, inner diameter (id 9.53 mm, which is kept at 372±1° C., held for 5 minutes therein, and extruded through an orifice, 2.1 mm id and 8 mm long, under a 49.03 N (5 kg) load (piston plus weight), thereby measuring the rate of extrusion (g/10 min) to be reported as an MFR.

(2) Molecular Weight Distribution Index (MWDI)

The shear rate dependence of MFR is a function of molecular weight distribution (J. M. Dealey and K. F. Wissbrun, Melt Rheology and Its Role in Plastics Processing, Van Nostrand Reinhold, New York 1990, p. 597). The ratio of MFR determined with different weights is therefore an index of molecular weight distribution. The same melt indexer used for MFR is employed; a 5 g sample is filled into a cylinder, id 9.53 mm, held at 372±1° C. for at least 5 minutes, and extruded through an orifice, 2.1 mm id and 8 mm long, under a 5 kg load (piston plus weight), thereby measuring the viscosity of the resin from the amount of the extrudate per unit time, to be reported as an $MV_5$. Next, a 5 g sample is held at least 5 minutes after having been charged, followed by applying an 0.833 kg load to extrude it through an orifice, 2.1 mm in diameter and 8 mm long, and from the amount of the extrudate per unit time the resin viscosity is obtained, to be reported as $MV_{10}$. The molecular weight distribution index of a resin is obtained from the ratio between $MV_5$ and $MV_{10}$.

Molecular weight distribution index $(MWDI) = MV_{10}/MV_5$ (3) Differential Scanning Calorimeter (DSC) Half-Width Value This value is the half-width, in ° C., of the first main peak in a melting curve obtained in a DSC measurement (10° C./min). The measurement is made on polymer that has not been previously melted, i.e. it is a "first heat". The half-width is the width of the peak at the midpoint between the base and the vertex of the peak.

(4) Measurement of PAVE Content in the Copolymer

PAVE content is determined according to the procedures of U.S. Pat. No. 5,932,673.

(5) Flex Life Ratio

The flex life is calculated from MWDI using equation 2 when the MFR and PPVE content were held constant, which is compared to a flex life of 1 for the PFA obtained in the comparative example without adding any terpene, in terms of percent increase in flex life.

Example 1

A 4 liter volume stainless steel horizontal autoclave equipped with horizontal stirring blades is stirred and filled with 2.5 liter of pure water and 5 g of ammonium perfluoro octanoate. After degassing the system, ethane is introduced to reach 0.03 MPa, followed by charging 46.5 g of perfluoro vinyl ether (PPVE) having 52.8 ppm of d-limonene dissolved therein. TFE is introduced into the autoclave until a pressure of 2.06 MPa is reached. 0.16 g of the polymerization initiator APS is introduced to initiate polymerization and is then also continuously added during polymerization at the rate of 2.4 mg/min. Additional PPVE amounting to 36 g is also added during the polymerization. 120 minutes after the start of polymerization, a liquid dispersion containing 23.4% by weight solids is obtained. Table 1 summarizes the physical properties of the PFA resin obtained from the dispersion.

Example 2

Example 1 is repeated except for using PPVE containing 162.7 ppm of d-limonene dissolved therein. 120 minutes after the initiation of the polymerization a liquid dispersion containing 22.3% by weight of solids is obtained. The physical properties of the PFA resin obtained from the dispersion are summarized in Table 1.

Comparative Example 1

Example 1 is repeated except for the use of PPVE alone without any d-limonene. 120 minutes after polymerization, a dispersion containing 22.2% by weight of solids is obtained. The physical properties of the PFA resin obtained from the dispersion are summarized in Table 1.

TABLE 1

|  | Example 1 | Example 2 | Comp. Example 1 |
|---|---|---|---|
| Polymerization Conditions |  |  |  |
| Concentration of Limonene in Polymerization Kettle (ppm) |  |  |  |
| At initiation of polymerization | 10.41 | 32.05 | 0 |
| At completion of polymerization | 4.01 | 13.17 | 0 |
| Initiator (APS) (total amount (g)) | 0.356 | 0.356 | 0.356 |
| Initial Charge of APS (g) | 0.16 | 0.16 | 0.16 |
| APS added later (g) | 0.196 | 0.196 | 0.196 |
| Total PPVE used (g) | 82.5 | 82.5 | 82.5 |
| Limonene in PPVE (ppm) | 52.8 | 162.7 | 0 |
| Total TFE used (g) | 888.7 | 829.5 | 829.5 |
| Ethane (liters @ 0° C., 101 kPa) | 0.77 | 0.77 | 0.77 |
| Raw Dispersion weight (g) | 3341 | 3283 | 3272 |
| PFA Properties |  |  |  |
| MFR (g/10 min) | 5.8 | 2.2 | 7.4 |
| PPVE Content (wt %) | 5.4 | 5.5 | 5.6 |
| DSC Half-width value (° C.) | 7.2 | 5.6 | 8.9 |
| MWDI | 1.22 | 1.16 | 1.3 |
| Flex Life Ratio* | 1.6 | 2.4 | 1 |

*Flex Life Ratio is calculated using Equation 2. By thus holding the MFR and PPVE content constant, the effect of MWD as reflected in MWDI is seen.

Table 1 shows that the PFA from the comparative example obtained by polymerization without limonene has an MWDI of 1.3 while PFAs obtained in Examples 1 and 2 by polymerization in the presence of limonene have MWDIs of 1.22 and 1.16. With the MFR and PPVE content held constant, reducing MWDI from 1.3 to 1.22 and to 1.16 increases the flex life 1.6 times with Example 1 (4.04 ppm limonene added, based on total monomer) and 2.4 times with Example 2 (13.17 ppm limonene added, based on total monomer) showing that the addition of limonene in the polymerization improves physical properties. Preferably the amount of terpene is sufficient to reduce the MWDI by at least 5% compared to the MWDI of polymer made without the presence of terpene. Comparison of Example 1 with Comparative Example 1 shows the profound effect of a 6% reduction in MWDI on flex life. The 6% reduction in MWDI results in a 60% increase in flex life.

What is claimed is:

1. A process for the manufacture of a melt-fabricable tetrafluoroethylene-perfluoro(alkyl vinyl ether) copolymer which comprises copolymerizing tetrafluoroethylene and a perfluoro(alkyl vinyl ether) in the presence of a terpene in an aqueous polymerization medium, the amount of terpene present being about 1 ppm to about 100 ppm per total amount of monomers of the tetrafluoroethylene and perfluoro(alkyl vinyl ether) in the polymerization process.

2. The process of claim 1 wherein the terpene is at least one compound having formula

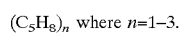 $(C_5H_8)_n$ where $n=1-3$.

3. The process of claim 1 wherein the terpene is limonene.

4. The process of claim 1 wherein the amount of terpene present is about 1 to about 20 ppm per total amount of monomers of the tetrafluoroethylene and perfluoro(alkyl vinyl ether) in the polymerization process.

5. The process of claim 1 wherein said copolymerizing is also carried out in the presence of gas phase chain transfer agent.

6. A process for the manufacture of a melt-fabricable tetrafluoroethylene-perfluoro(alkyl vinyl ether) copolymer which comprises copolymerizing tetrafluoroethylene and a perfluoro(alkyl vinyl ether) in the presence of a terpene in an aqueous polymerization medium, the amount of terpene present being effective to narrow the molecular weight distribution of said copolymer, the narrowing of said molecular weight being characterized by said copolymer having a DSC melting peak with a half-width that is at least 10% less than that of the DSC melting point half-width of the copolymer when made without the presence of terpene.

* * * * *